(12) United States Patent
Larkin

(10) Patent No.: US 12,724,210 B2
(45) Date of Patent: Sep. 1, 2026

(54) FIBER INSPECTION TOOL WITH MANUAL ADJUSTMENT

(71) Applicant: Kevin B. Larkin, Pebble Beach, CA (US)

(72) Inventor: Kevin B. Larkin, Pebble Beach, CA (US)

( * ) Notice: Subject to any disclaimer, the term of this patent is extended or adjusted under 35 U.S.C. 154(b) by 173 days.

(21) Appl. No.: 18/674,871

(22) Filed: May 26, 2024

(65) Prior Publication Data

US 2024/0310585 A1 Sep. 19, 2024

Related U.S. Application Data

(63) Continuation-in-part of application No. 17/839,852, filed on Jun. 14, 2022, now Pat. No. 12,001,063, (Continued)

(51) Int. Cl.
*G02B 6/38* (2006.01)
*G02B 21/00* (2006.01)
(Continued)

(52) U.S. Cl.
CPC .......... *G02B 6/385* (2013.01); *G02B 6/3809* (2013.01); *G02B 6/3898* (2013.01); (Continued)

(58) Field of Classification Search
CPC .. G02B 6/385; G02B 6/3898; G02B 21/0004; G02B 21/0008; G02B 21/0016; (Continued)

(56) References Cited

U.S. PATENT DOCUMENTS 5,196,899 A 3/1993 Serwatka
6,508,593 B1 1/2003 Farnsworth et al.
(Continued)

FOREIGN PATENT DOCUMENTS

CN 110262027 A 9/2019
WO 2018010849 A1 1/2018
WO 2025250442 A1 12/2025

OTHER PUBLICATIONS

International Search Report and Written Opinion, International Searching Authority, PCT Application No. PCT/US2025/030616, Jul. 21, 2025, 12 pgs.

*Primary Examiner* — Michael Stahl

(57) ABSTRACT

The purpose of this continuation is to increase the viewing magnification of the already issued patent U.S. Pat. No. 11,385,412 B2. By the addition of a module housing that has the capability of allowing for additional magnification, lighting and focusing capabilities. A module housing case is described. The modular housing case includes a fiber optic component housing defined as a cavity and or cavities that are sized to receive a fiber optic connector and or connectors. Within the cavity or cavities is a ferrule guide or ferrule guides. The module housing case also has an internal cavity that is at least partially enclosed. Components to assist in magnification may be disposed at least partially or fully within the internal cavity. Those components can range from a lighting system powered by internal electronics or a system that relies on the cell phone camera flash and or flashlight LED for internal fiber end face lighting. Finally, the module housing case employs a camera lens alignment feature that can be adjusted manually to increase magnification of the field of view by the raising and or lowering of the module housing case.

7 Claims, 18 Drawing Sheets

Related U.S. Application Data which is a continuation of application No. 17/324,462, filed on May 19, 2021, now Pat. No. 11,385,412.

(60) Provisional application No. 63/030,066, filed on May 26, 2020.

(51) Int. Cl.
*G02B 21/36* (2006.01)
*G01M 11/00* (2006.01)

(52) U.S. Cl.
CPC ....... *G02B 21/0004* (2013.01); *G02B 21/362* (2013.01); *G01M 11/30* (2013.01)

(58) Field of Classification Search
CPC ........ G02B 21/36; G02B 21/362; G02B 7/04; G02B 7/10; G02B 7/105; G02B 15/00; G02B 15/14; G02B 15/22; G02B 13/001; G02B 13/009
See application file for complete search history.

(56) References Cited

U.S. PATENT DOCUMENTS 7,356,236 B1 4/2008 Huang et al.
7,373,069 B2 5/2008 Lazo
9,800,330 B1 10/2017 Yusuf et al.
2001/0055448 A1* 12/2001 Sato .................... G02B 6/3807 385/53
2006/0204200 A1 9/2006 Lampert et al.
2007/0217749 A1 9/2007 Jong et al.
2013/0300919 A1 11/2013 Fletcher et al.
2014/0327735 A1 11/2014 Ruchet et al.
2014/0362283 A1 12/2014 Coppage et al.
2015/0062564 A1 3/2015 Kowalczyk et al.
2015/0116699 A1 4/2015 Meek et al.
2015/0171959 A1 6/2015 Kim et al.
2015/0177147 A1 6/2015 Mangan et al.
2015/0285708 A1* 10/2015 Forrest, Jr. ............ G02B 6/385 356/73.1
2015/0362828 A1 12/2015 Patel et al.
2016/0004057 A1 1/2016 Lin et al.
2016/0320565 A1 11/2016 Brown et al.
2017/0119250 A1 5/2017 Kolachalama et al.
2017/0199364 A1 7/2017 Doric et al.
2018/0180866 A1 6/2018 Kaminaga
2020/0019042 A1 1/2020 Crispin
2022/0308292 A1 9/2022 Larkin
2024/0310585 A1 9/2024 Larkin

* cited by examiner 15
2
3
18
17
13
5
20
10
21
19
25

15
2
4
9
18
17
26
13
5
20
21
19
11
25

29
2
19
1
18
23
22
24

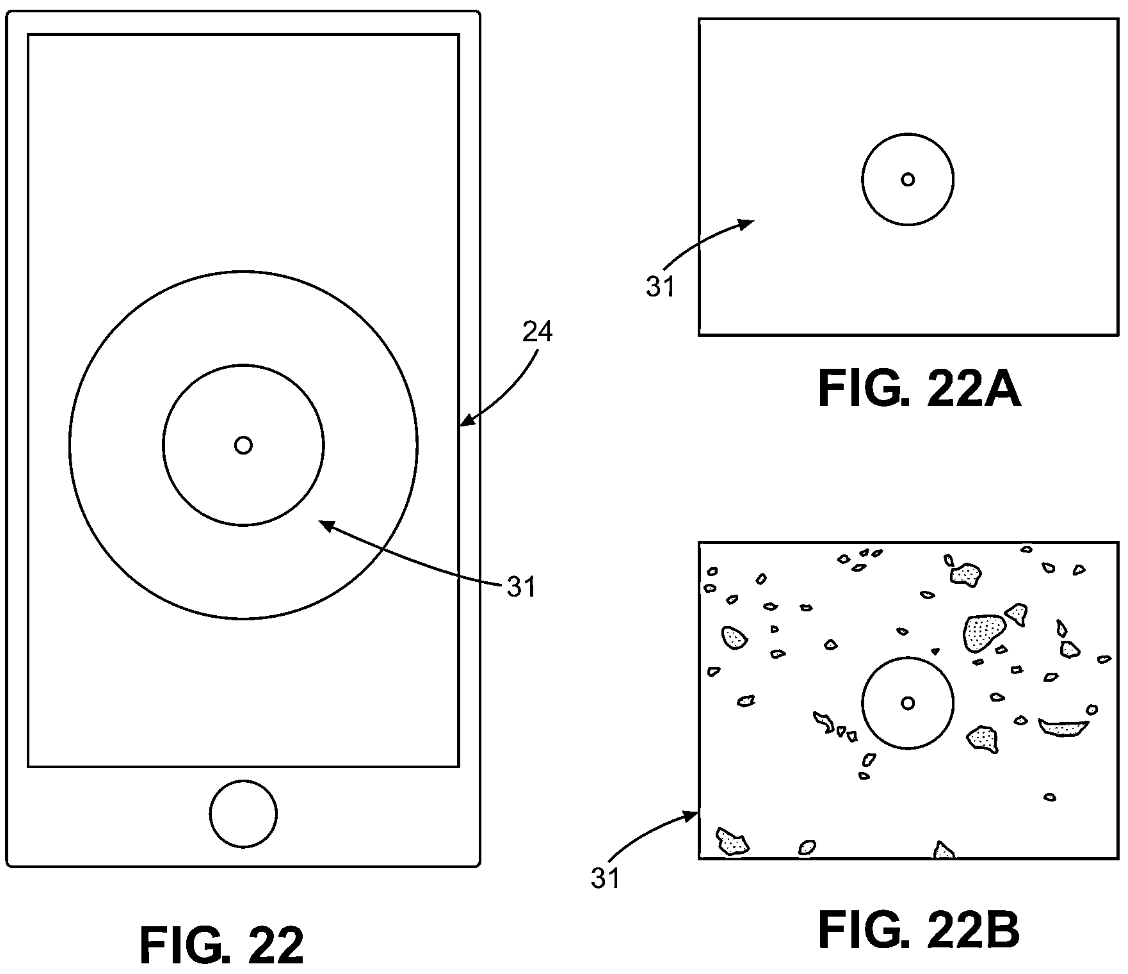
FIG. 22
FIG. 22A
FIG. 22B
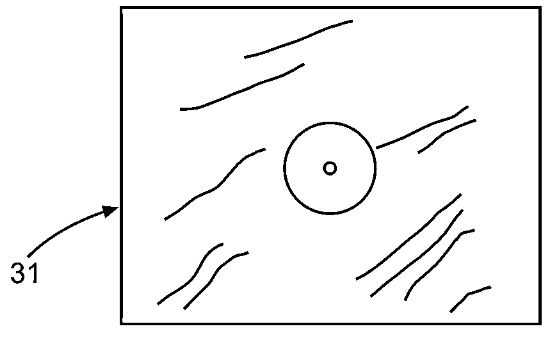
FIG. 22C

FIBER INSPECTION TOOL WITH MANUAL ADJUSTMENT

PRIORITY

The Continuation in Part is the addition of a manual field of scope focusing system that motions to increase the adjustment of the visual magnification. The CIP increases the focusing capability of the existing patent. The CIP is a housing module that features the fiber connector sockets as outlined in US Patent U.S. Pat. No. 11,385,412B2 with the addition of a threaded and or vertical slide adjust system and or equivalents. The threaded or vertical slide adjustment consists of a housing with an additional Lense and or lenses for the purpose of increasing the magnification and focusing of the fiber end faces beyond the standard invention. The threaded or vertical slide system housing incorporates the same type of fixed or interchangeable female cavities as shown in the explanation of numbered picture descriptions in FIGS. 1)2)3)4)6)7)8A)8B)8C)9A)9B)9C)10)14)26)27 with the addition of another lens as described in 10)

TECHNICAL FIELD OF DESCRIPTION

The original Fiber inspection Tool U.S. Pat. No. 11,385,412 B2 was created for the purpose of turning a cell phone into a fiber test tool.

The CIP outlines a mechanism 1) module housing that would now be 2 individual module housings that when combined would make one module housing resembling the original module housing. The New 2-part module housing features the ability to adjust the two module housings with the purpose of adding a focusing mechanism to adjust the field of view. The module housing 1/2 would incorporate an additional lens and or lenses to create a viewing system to assist in increasing the magnification levels when viewing the fiber optic components as described in the original patent. The above described mechanism with the purpose of adjusting the upper housing module into a module with the addition of an additional lens and or magnification system and lighting for the purpose of adjusting these components over the lens and lighting system that is housed in the lower or primary module. The upper module housing would align the primary lower module to maintain a perfect field of vision scope over the camera lens in the cell phone or any other portable device with the purpose of viewing fiber end faces and or testing.

The adjusting of the field of vision mechanism is housed in the secondary module housing or in the primary housing with the purpose of raising and or lowering the two housings mated together for the purpose of creating a perfect alignment of the fiber end face and or end faces and the camera lens for the purpose of visual magnification and observation on the cellphone screen. Photos at the increased magnification can then be taken and stored of sent to the cloud for record keeping.

DETAILED DESCRIPTION

The fiber optic connector jack can be changed out to fit different variations of Fiber plugs, connectors, ferrules and or any means of visually inspection of the fiber end face. The upper secondary module which holds the female and or male cavities can be removed and exchanged for an identical mounting housing module except for different style fiber plug cavities to support the fiber connector fiber plug-ins to be inspected that are common to the industry. The upper secondary module housing features screw in attachment and or a slide in and lock and or a snap in type mechanism to keep it in place or position when in use.

BACKGROUND

The patent covers a half or full protection case that is common to the industry to protect the cell phone and or lap top case. In both of these applications there is a cut-out on the back of the back of the case to allow for the use of the camera thru the lens and or cameras through the lens as well as the flashlight and or camera flash.

The application we are discussing here is the full cover or half cover will have a opening that that is large enough to let a mounting plate that attaches to the module housing that acts as a base that mates semi-permanently onto or inside the large cut out square or opening molded into the case. The mounting plate will position inside the opening and lock in semi-permanent allowing the module housing with lens when positioned onto mounting plate to be adjusted to obtain the desired field of view.

EXPLANATION OF NUMBERED PICTURE DESCRIPTIONS IN FIGURES

1) Fiber Jack and or Jack Cavities
2) Focus Module Housing
3) Threaded Focus Adjustment
4) Slide Sleeve Focus Adjustment
5) Magnification Lense
6) Fiber Ferrule Port Guide
7) Module Housing Adapter Base
8) Focus Adjustment Receiver Threads
9) Focus Adjustment Slide/Sleeve
10) Module Housing Adapter Base with Receiver Threads
11) Module Housing Adapter Base with Slide/Sleeve Receiver
12) Module Housing Adapter Base with Male Cell Phone Case Cavity Mating Semi-Permanent Adapter System
13) Module Housing Adapter Base with Magnification Lens
14) Module Housing Adapter Base with Offset Module Housing Camera Lense Alignment Hole
15) Module Housing Dust Cover
16) Module Housing Adapter Base with Battery, LED, Charge Port, Electronics and On/Off switch.
17) Module Housing Adapter Base Cell Phone Case Receiver Cavity Semi Permanent Retainer Contact Point or Strap
18) On/Off Switch
19) Battery Charging Port
20) LED and or LEDS
21) Electronics
22) Cell Phone Camera Lens
23) Cell Phone Flash LED
24) Cell Phone
25) Cell Phone Case
26) Cell Phone Case Module Housing Adapter with Female Receiver Cavity Semi Permanent Mating Adapter
27) Reflective Light Ring
28) Semi-Permanent Module Base Attachment Mounting System
29) Slide On Module Housing Base with Built-In Electronics and Magnification
30) Simplex and or Duplex Fiber Connector Plugs (Rotation)

31) Fiber End Face (Inspection) Picture on Cell Phone Screen

32) (Clean Fiber End Face A, Dirty Fiber End Face B, Scratched Fiber End Face

BRIEF DESCRIPTION OF FIGURES

As shown in FIG. 15 with the rotation arrow.

FIG. 18 is a detailed (top view) of the focus module housing adapter base with built in battery, charging port 19, electronics 21) and on/off switch 18. 1) with different types of fiber connector cavity 22) and or cavities 23), LED and or LEDS 20), a magnification lens 5) and a perimeter male cell phone case cavity mating semi-permanent adapter system 12).

FIG. 19 is a mirrored detail of FIG. 18 apart from the multiple LED's surrounding the magnification lens 20) to a single LED 20) shown in FIG. 19 to illuminate the non-powered reflective light ring 27).

FIG. 19A is a side view cut-away of the focus module housing adapter base with slide sleeve receiver 11) and magnification Lens 5) and LEDS 20) and slide sleeve focus adjustment cutaway 4).

FIG. 19B 19 A is a side view cut-away of the focus module housing adapter base 10) with receiver threads 8) and magnification Lens 5) and reflective light ring 27) and LED 20) with electronics 21).

FIG. 20 is an angle view of the focus module housing adapter base with slide sleeve receiver 11) and a angle picture of the focus adjustment slide sleeve 9) as well as an angle view of the module housing adapter base with male cell phone case cavity mating semi-permanent adapter system 12)

FIG. 21 is an angle view of the focus module housing adapter base with focus adjustment receiver threads 8)) and an angle view of the module housing adapter base with male cell phone case cavity mating semi-permanent adapter system 12)

FIG. 22 a top view of a cell phone 24) screen with a fiber end face core, cladding adhesive and ferrule 31) being monitored for inspection.

FIG. 22A Is a clean cell phone fiber inspection scope end face picture 31)

FIG. 22B is a dirty cell phone fiber inspection scope end face picture 31)

FIG. 22C is a scratched cell phone fiber inspection scope end face picture 31)

Figure 1:
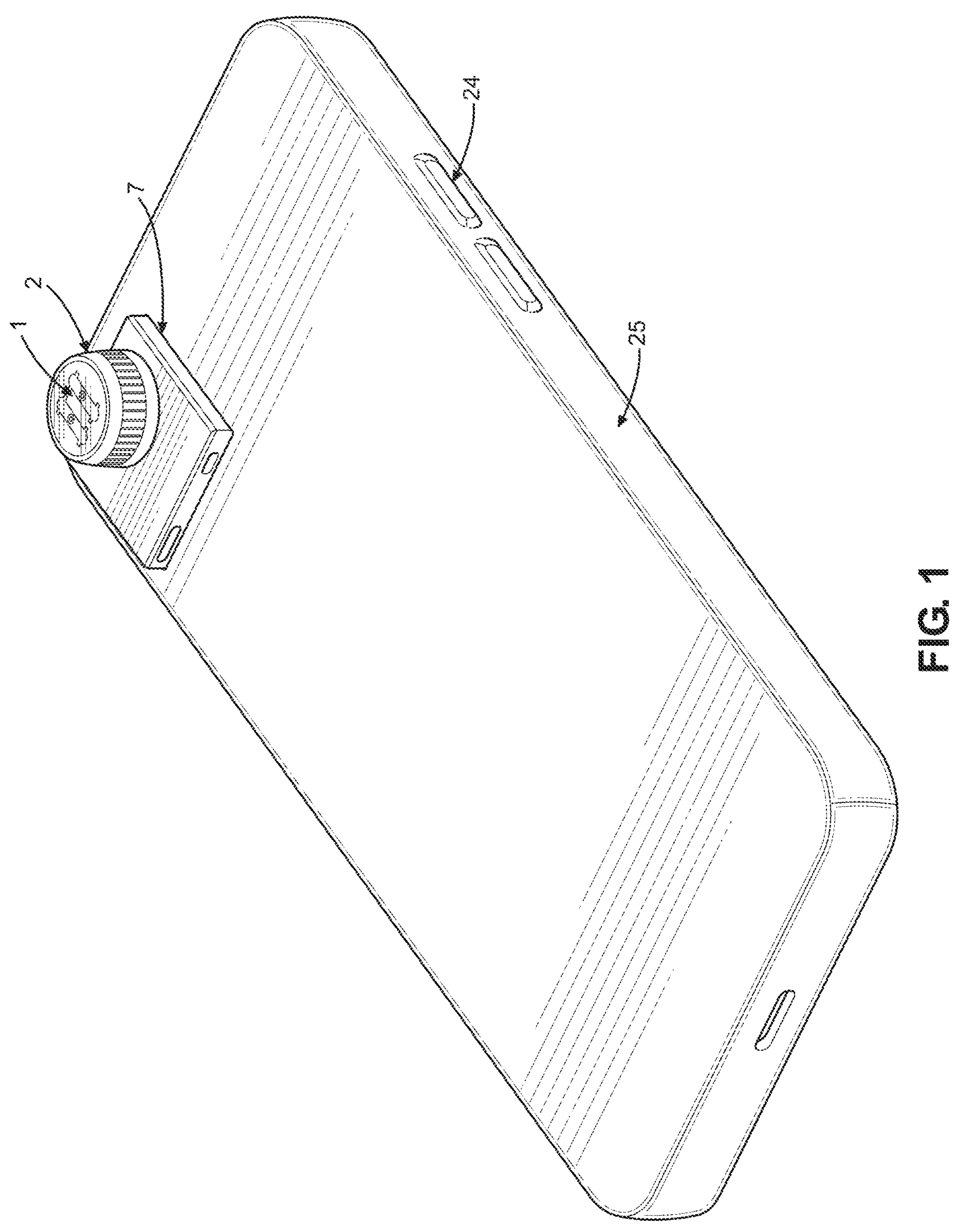
FIG. 1 is a first perspective view of the cell phone fiber inspection scope with a focus module housing 2) with cell phone module housing adapter base 7) in place on cell phone 24) and or cell phone case 25) with the fiber jack cavity 1) in alignment with internal magnification lens 5) and or lens's) with the desired cell phone camera lens 22) showing the application of said invention.
Figure 2:
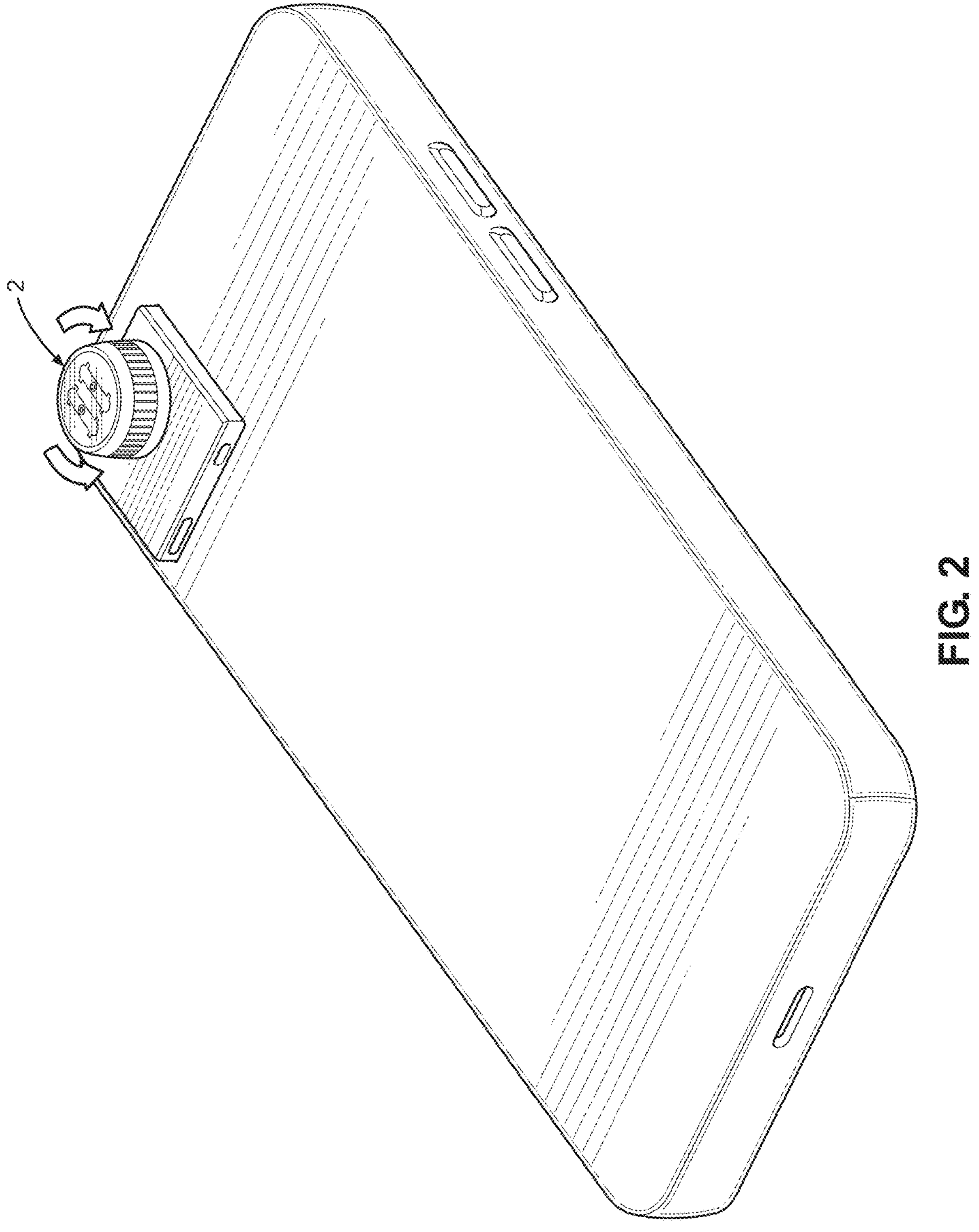
FIG. 2 is a second perspective view of the cell phone fiber inspection scope with a focus module housing 2) showing the application mentioned in FIG. 1 with the addition of the said focus module 2) being rotated as shown by directional arrows as to allow said focus module housing 2) magnification lens 5) and or lenses to be raised and or lowered into desired focus position in relationship with the cell phone camera lens 22) as to achieve a proper field of view and or focus of the fiber end faces as mentioned
Figure 3:
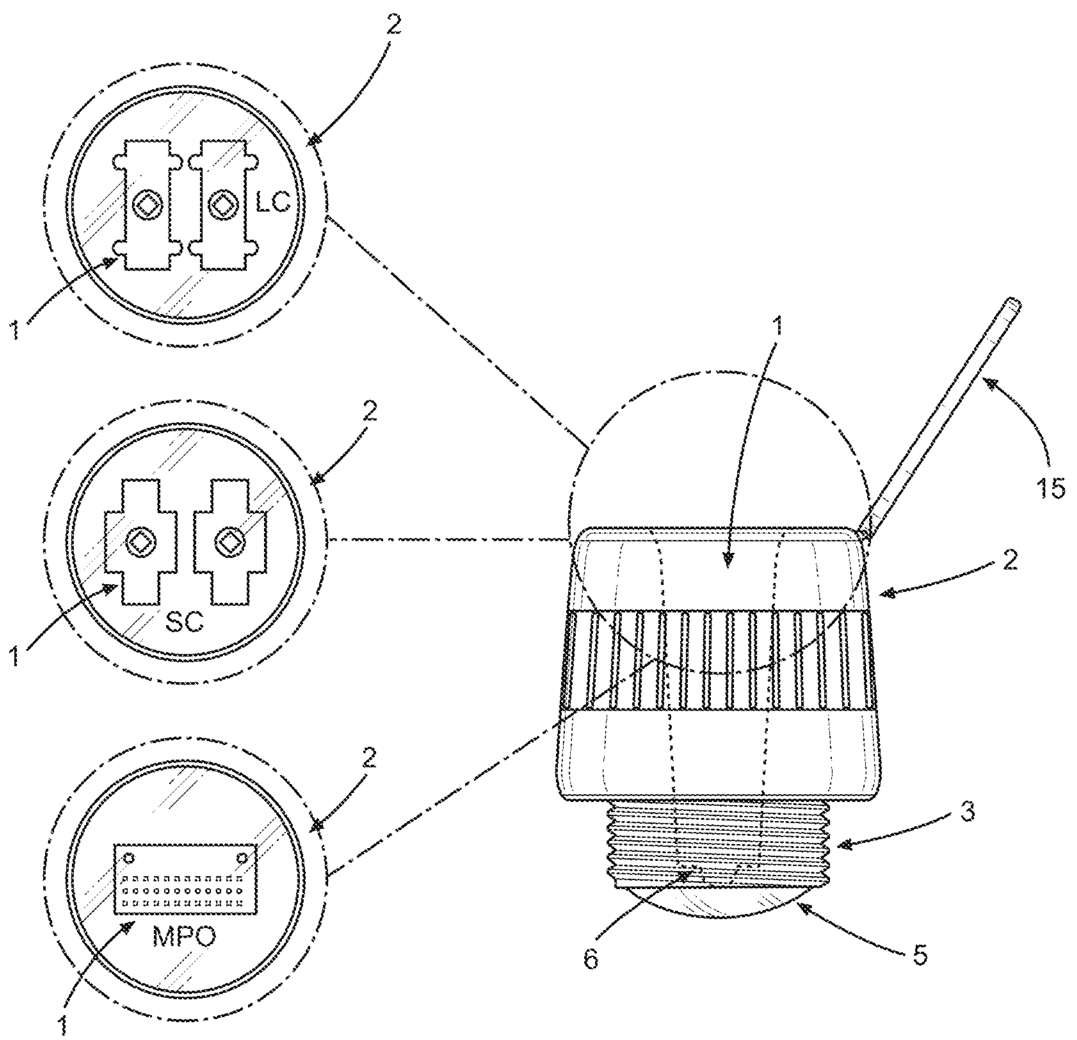
FIG. 3 is a third perspective view of the cell phone fiber inspection scope with focus module housing 2) showing the application mentioned in FIG. 1 with the addition of the said focus module 2) being manually raised and or lowered as shown in FIG. 2 by the directional arrows as to allow said focus module housing 2) to be raised and or lowered into desired focus position of said magnification lens 5) by said threaded focus adjustment 3) to achieve a proper field of view for the fiber jack and or jack cavities 1) housed in said focus module housing 2). A module housing dust cover 15) is shown for the purpose of sealing and protecting said jack cavity and or jack cavities 1) from being contaminated by foreign materials when said jack cavity and or cavities 1) are vacant and exposed to the elements. Also shown in FIG. 3 is a side view of the fiber cavity and or cavities 1) with the fiber ferrule port guide 6) shown for the purpose of aligning and protecting the fiber connector and or fiber cable end face and or end faces.
Figure 4:
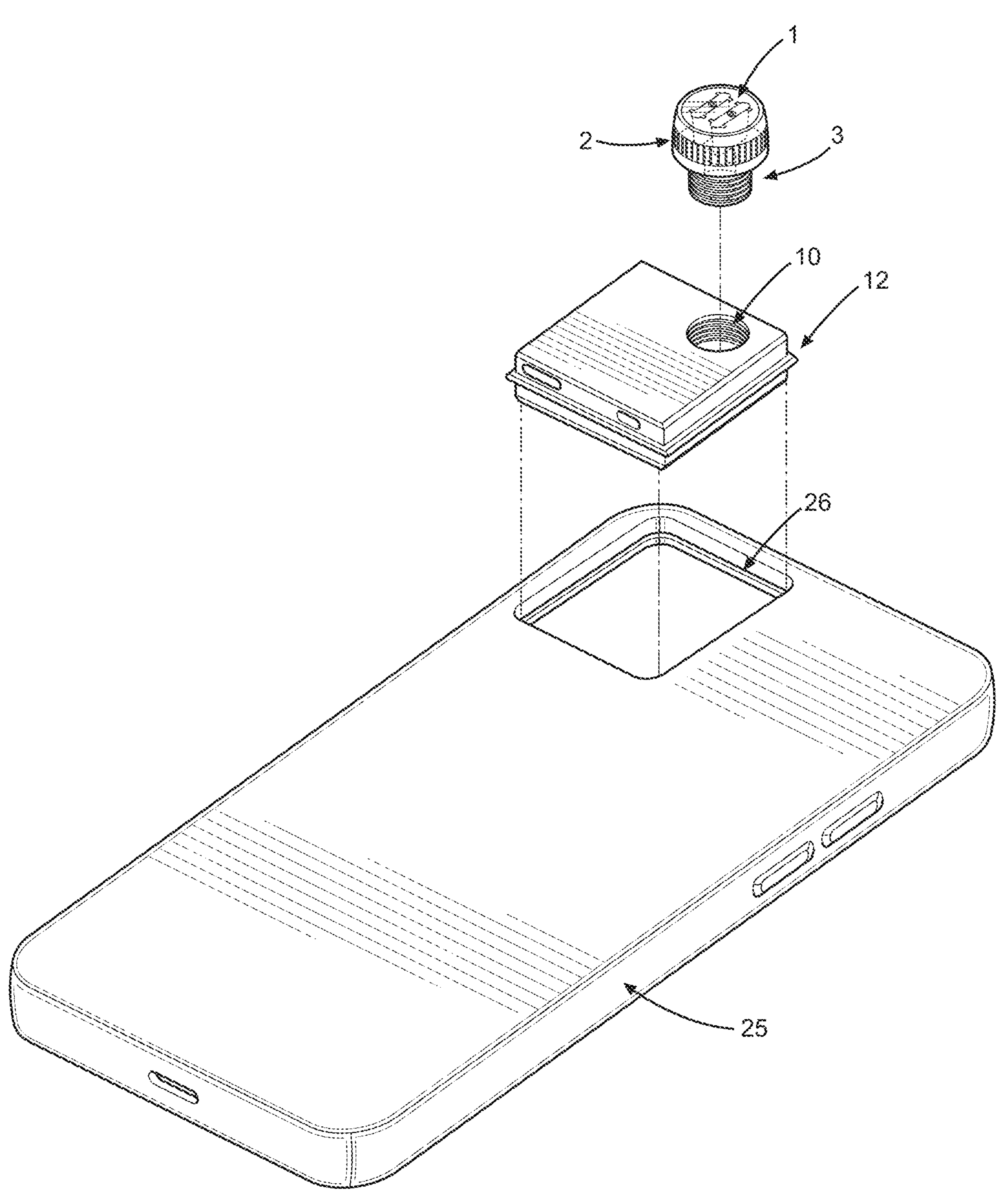
FIG. 4 is the detail perspective view of the focus module housing 2) with said fiber jack cavity 1) and or cavities 1) with said threaded focus adjusting mechanisms 3) as mentioned in FIG. 2 and FIG. 3 that mates to said module housing adapter base with receiver threads 10). Said module housing adapter base with male cell phone case cavity mating semi-permanent adapter system 12) that mates with cell phone case module housing adapter base with female receiver cavity semi-permanent mating adapter system 26).
Figure 5:
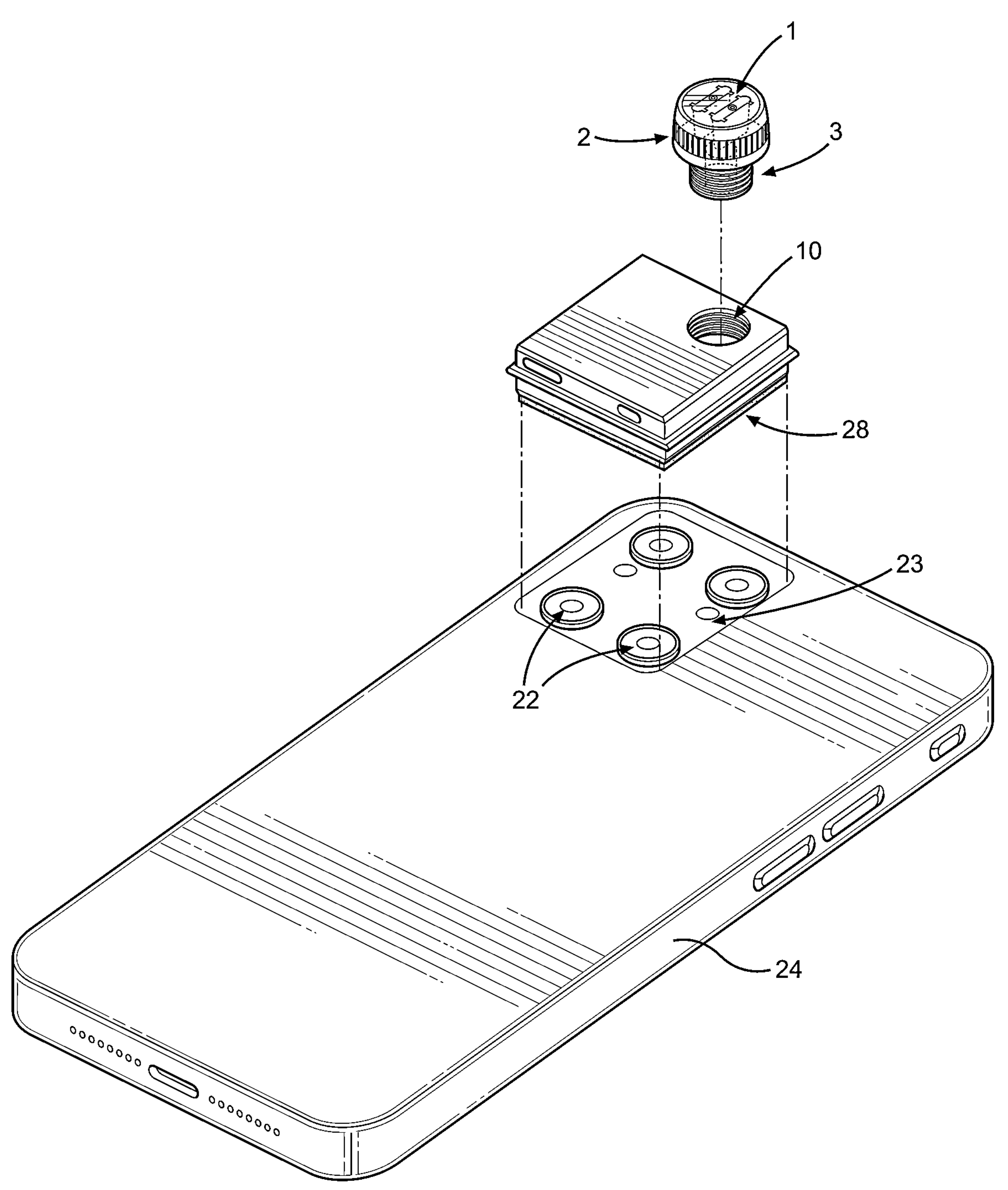
FIG. 5 is the detail perspective view of the focus module housing 2) with said fiber jack cavity 1) and or cavities 1) with said threaded focus adjusting mechanisms 3) as mentioned in FIG. 2 and FIG. 3 and FIG. 4 that mates to said module housing adapter base with receiver threads 10). Said module base housing is equipped in this mounting application with a semi-permanent/removable mounting system 28) that is placed on said cell phone 24) to align with the cell phone camera lens 22) and cell phone flash LED 23) for the purposes described in viewing and focusing on the fiber connector end faces with the option of additional illumination provided by the said cell phone camera flash LED 23).
Figure 6:
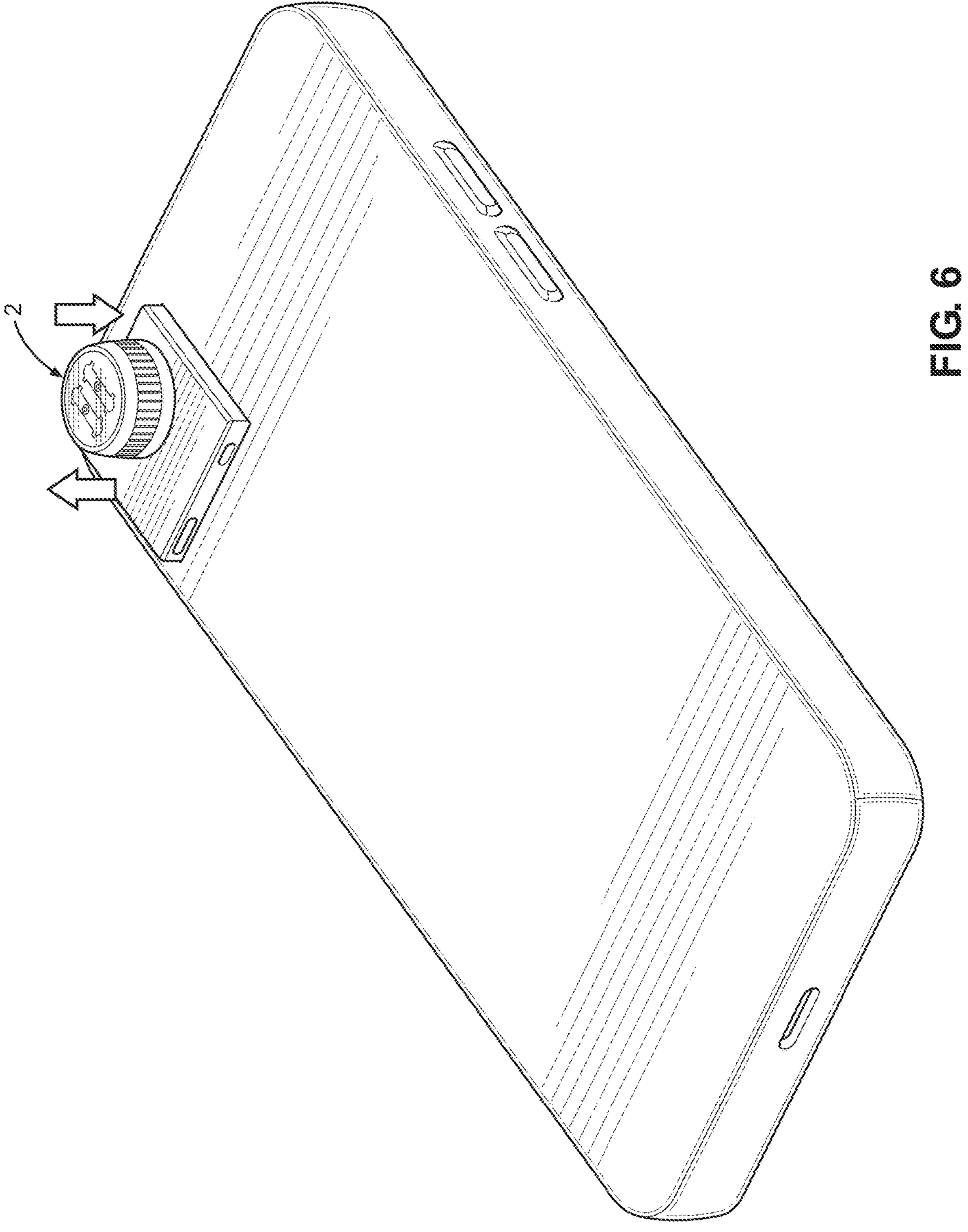
FIG. 6 is the detail perspective view of the focus module housing 2) with said fiber jack cavity 1) and or cavities 1) with the slide sleeve manual focus adjusting mechanisms 4) that mates to said module housing adapter base with slide/sleeve receiver 11) for the purpose of manually raising and or lowering said module housing adapter 2) as indicated by the arrows shown in FIG. 6 for the purpose of showing the application mentioned in FIG. 1 with the addition of the said focus module 2) being adjusted up or down shown by directional arrows as to allow said focus module housing 2) magnification lens 5) and or lenses to be raised and or lowered into desired focus position in relationship with the cell phone camera lens 22) as to achieve a proper field of view and or focus of the fiber end faces as mentioned is the detail perspective view of the of the focus module housing 2) with said fiber jack cavity 1) and or cavities 1) with the slide sleeve manual focus adjusting mechanisms 4) that mates to said module housing adapter base with slide/sleeve receiver) for the purpose of manually raising and or lowering said module housing adapter 2) for the purpose of base with male cell phone case cavity mating semi-permanent adapter system 12) that mates with cell phone case module housing adapter base with female receiver cavity semi-permanent mating adapter system 26).
Figure 7:
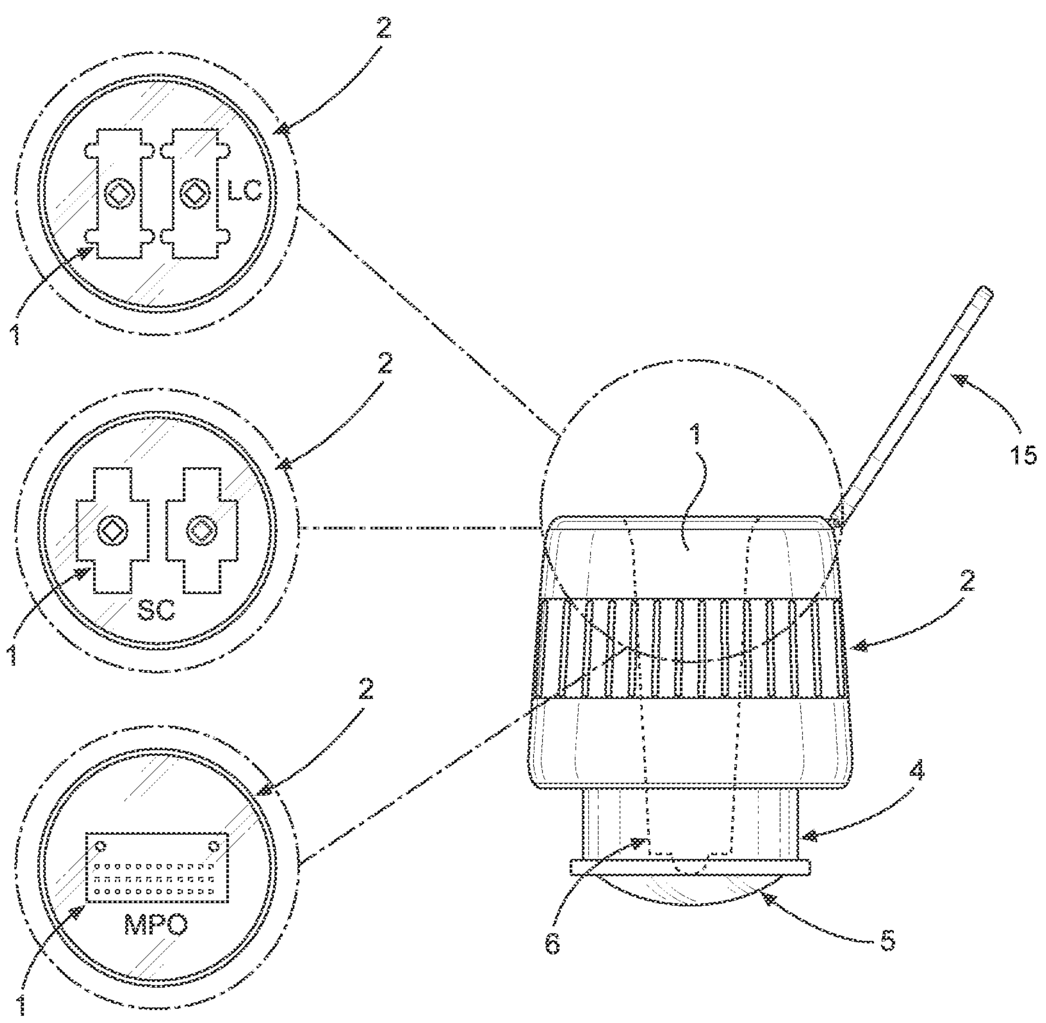
FIG. 7 is a perspective view of the cell phone fiber inspection scope with focus module housing 2) showing the application mentioned in FIG. 1 with the addition of the said focus module 2) being manually raised and or lowered as shown in FIG. 6 by the directional arrows as to allow said focus module housing 2) to be raised and or lowered into desired focus position of said magnification lens 5) by said Slide sleeve focus adjustment 4) to achieve a proper field of view for the fiber jack and or jack cavities 1) housed in said focus module housing 2). A module housing dust cover 15) is shown for the purpose of sealing and protecting said jack cavity and or jack cavities 1) from being contaminated by foreign materials when said jack cavity and or cavity 1) are vacant and exposed to the elements. Also shown in FIG. 3 is a side view of the fiber cavity and or cavities 1) with the fiber ferrule port guide 6) shown for the purpose of aligning and protecting the fiber connector and or fiber cable end face and or end faces.
Figure 8:
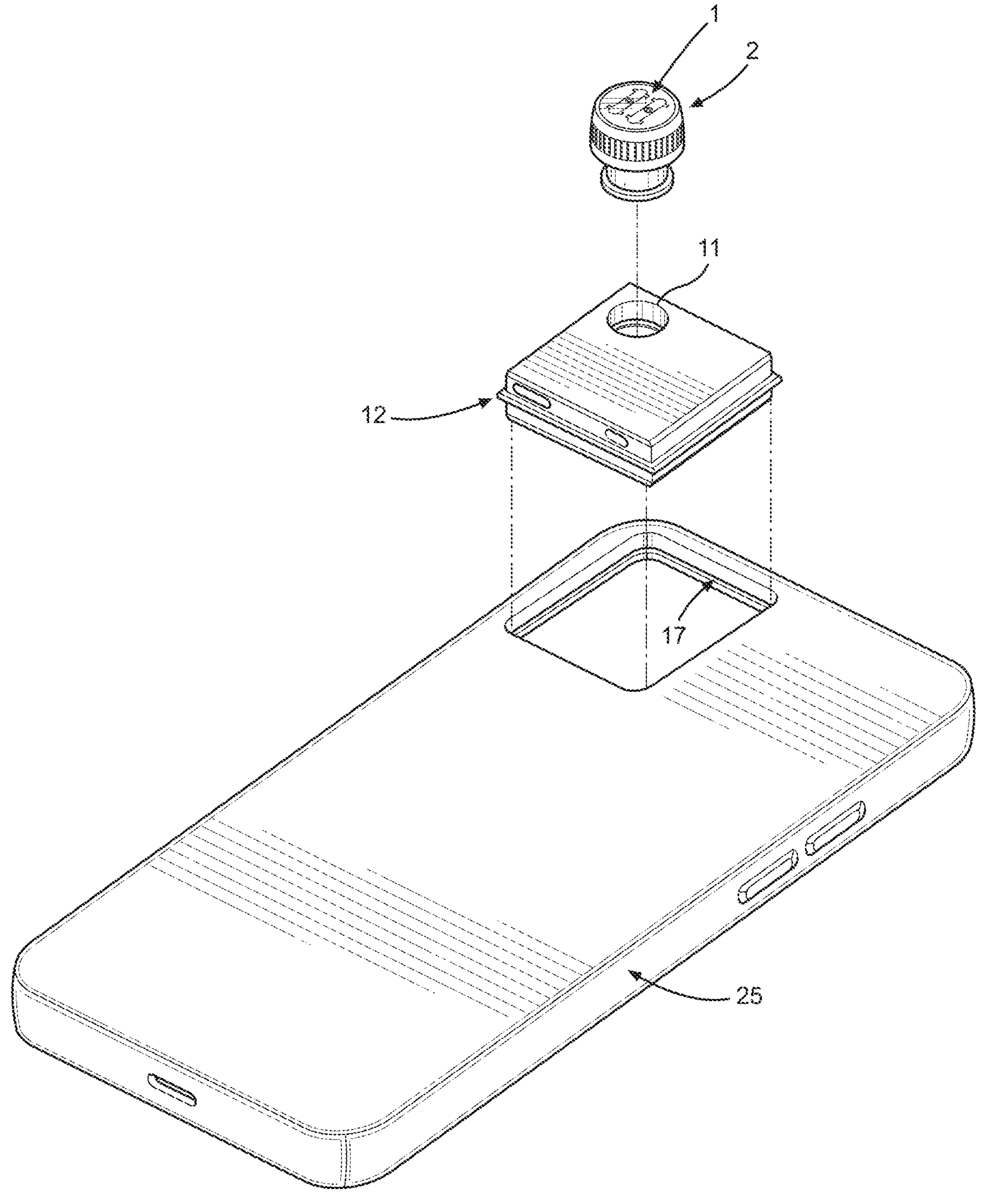
FIG. 8 is the detail perspective view of the focus module housing 2) with said fiber jack cavity 1) and or cavities 1) with said slide sleeve focus adjusting mechanisms 4) as mentioned in FIG. 1 and FIG. 3 that mates to said module housing adapter base with slide/sleeve receiver 11). Said module housing adapter base with male cell phone case receiver cavity mating semi-permanent adapter system 12) that mates with the cell phone case female receiver cavity semi-permanent retainer contact point and or snap 17).
Figure 9:
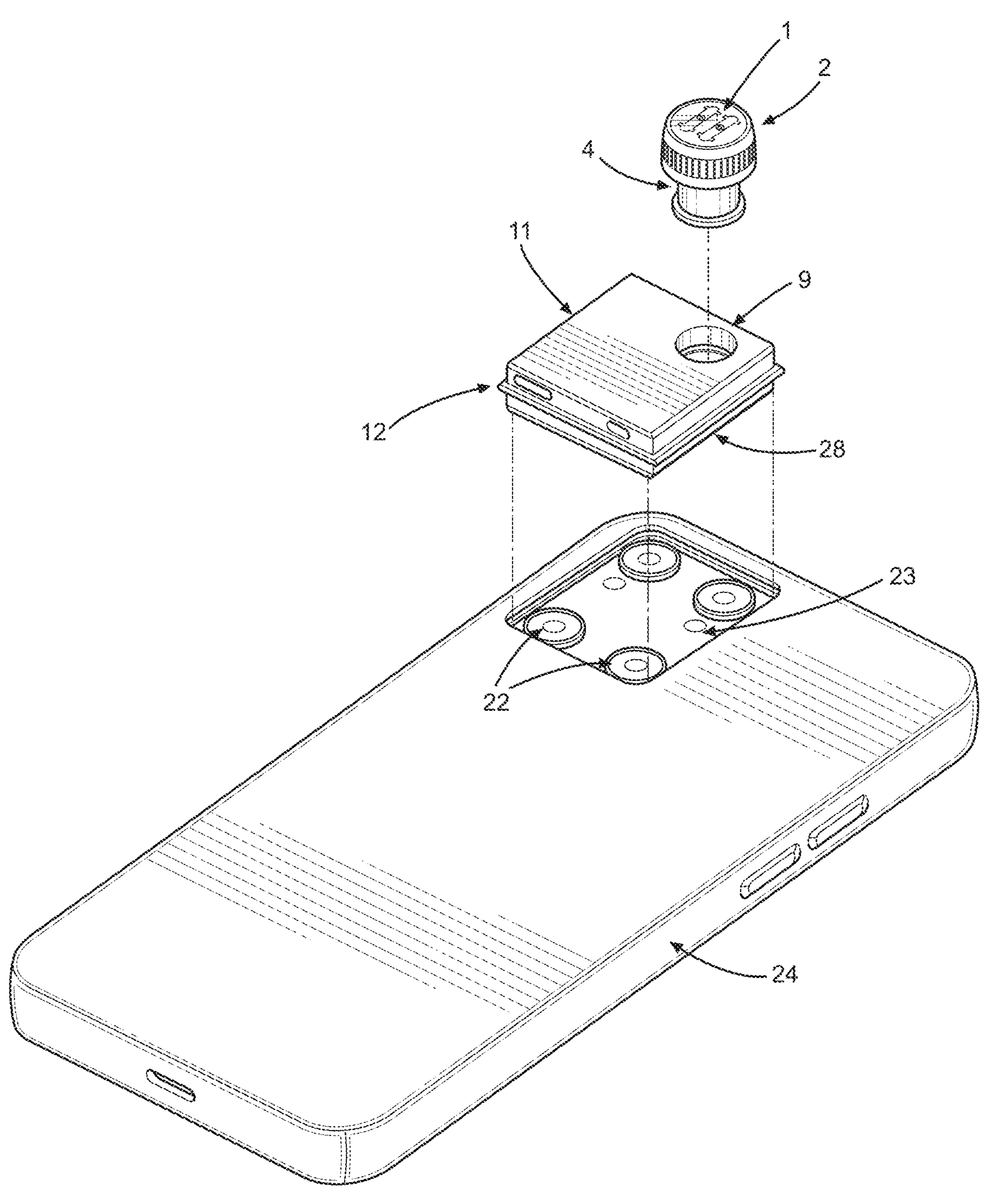
FIG. 9 is the detail perspective view of the focus module housing 2) with said fiber jack cavity 1) and or cavities 1) with said slide sleeve focus adjusting mechanisms 4) as mentioned in FIG. 6 and FIG. 7 and FIG. 8 that mates to said module housing adapter base with slide/sleeve receiver 9. Said module base housing is equipped in this mounting application with a semi-permanent/removable mounting system 28) that is placed on said cell phone 24) to align with the cell phone camera lens 22) and cell phone flash LED 23) for the purposes described in viewing and focusing on the fiber connector end faces with the option of additional illumination provided by the said cell phone camera flash LED 23).
Figures 10, 11:
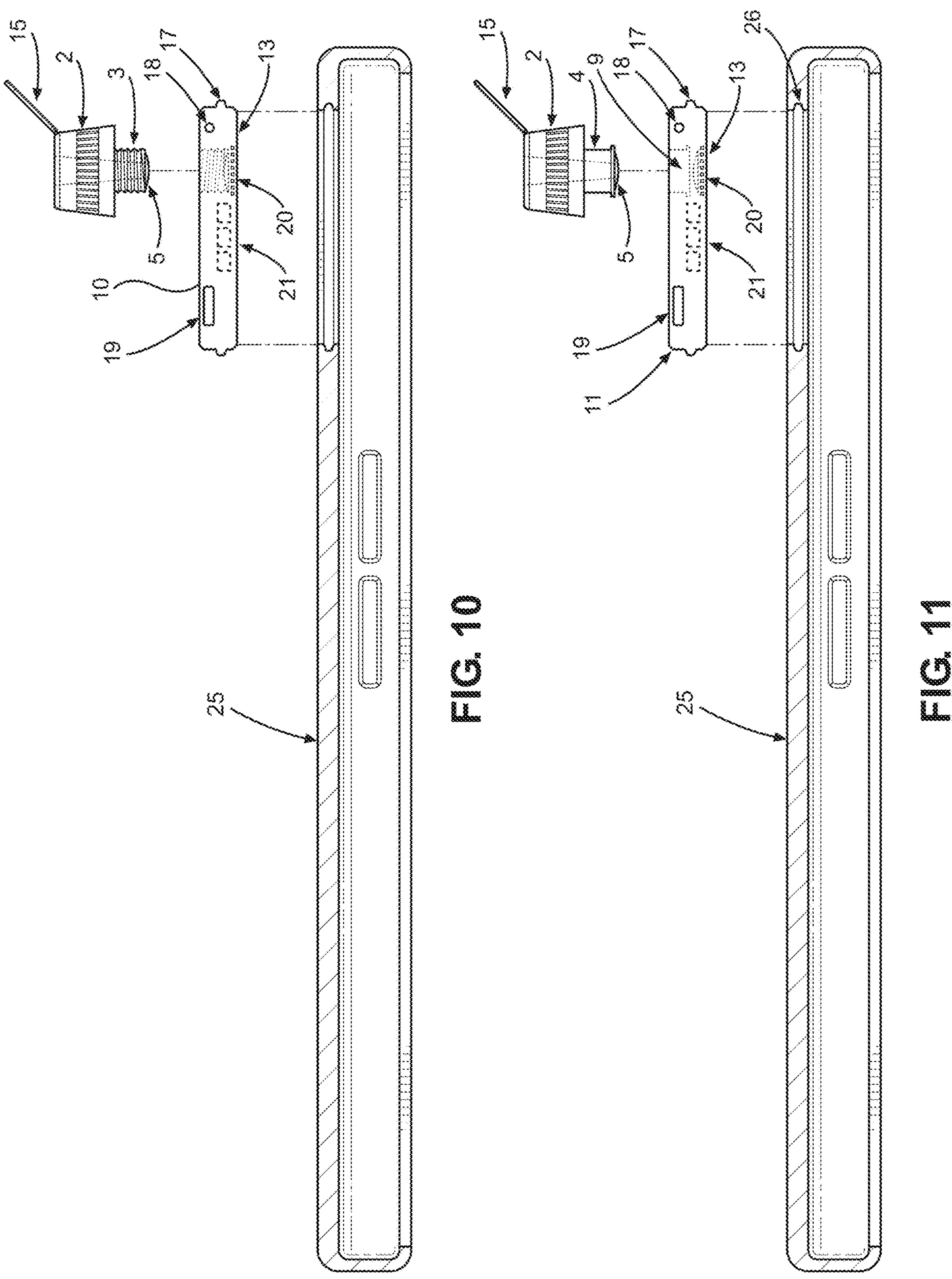
FIG. 10 is a detailed (side view) perspective of the Focus Module Housing 2) as described in FIG. 3. shown in position to be mated into said module housing base with receiver threads 10). Said module housing base 10) is shown with magnification lens 13) and with optional built in battery, charging port, electronics and switch 16). Also shown in FIG. 10 is the cell phone case 25) with retainer cavity to mate with module housing adapter base with cell phone case receiver cavity semi-permanent retainer contact point or snap 17).
FIG. 11 is a detailed (side view) perspective of the Focus Module Housing 2) as described in FIG. 6, FIG. 7, FIG. 8 and FIG. 9. shown in position to be mated into said module housing base with said slide sleeve focus adjustment 4). Said module housing base adapter base with slide sleeve receiver 11) is shown with magnification lens 13) and also with optional built in battery, charging port, electronics and switch 16). Also shown in FIG. 11 is the cell phone case 25) with retainer cavity to mate with module housing adapter base with cell phone case receiver cavity semi-permanent retainer contact point or snap 17) that mates with the cell phone case module housing adapter base with female receiver cavity semi-permanent mating adapter system 26) secured into position into the cell phone case 25).
Figure 12:
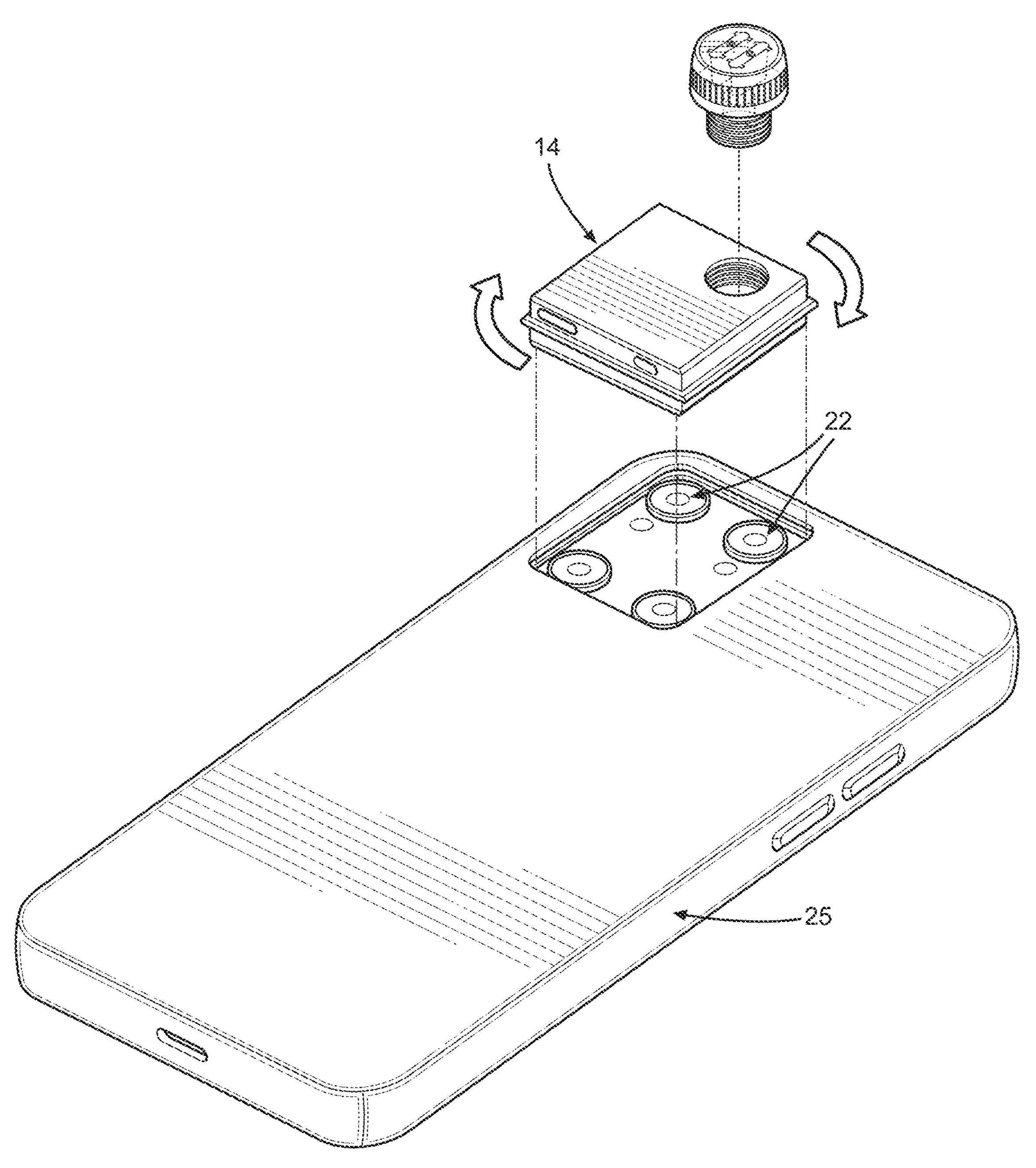
FIG. 12 is a detailed (angle view) perspective of the focus module housing adapter base with offset module housing camera lens alignment holes and or hole 14). Said module housing adapter base with offset camera lens alignment holes and or holes 14) is and can be rotated to align with said cell phone camera lens 22) in relationship to said cell phone manufactures camera lens placement 22) on the desired model of cell phone.
Figure 13:
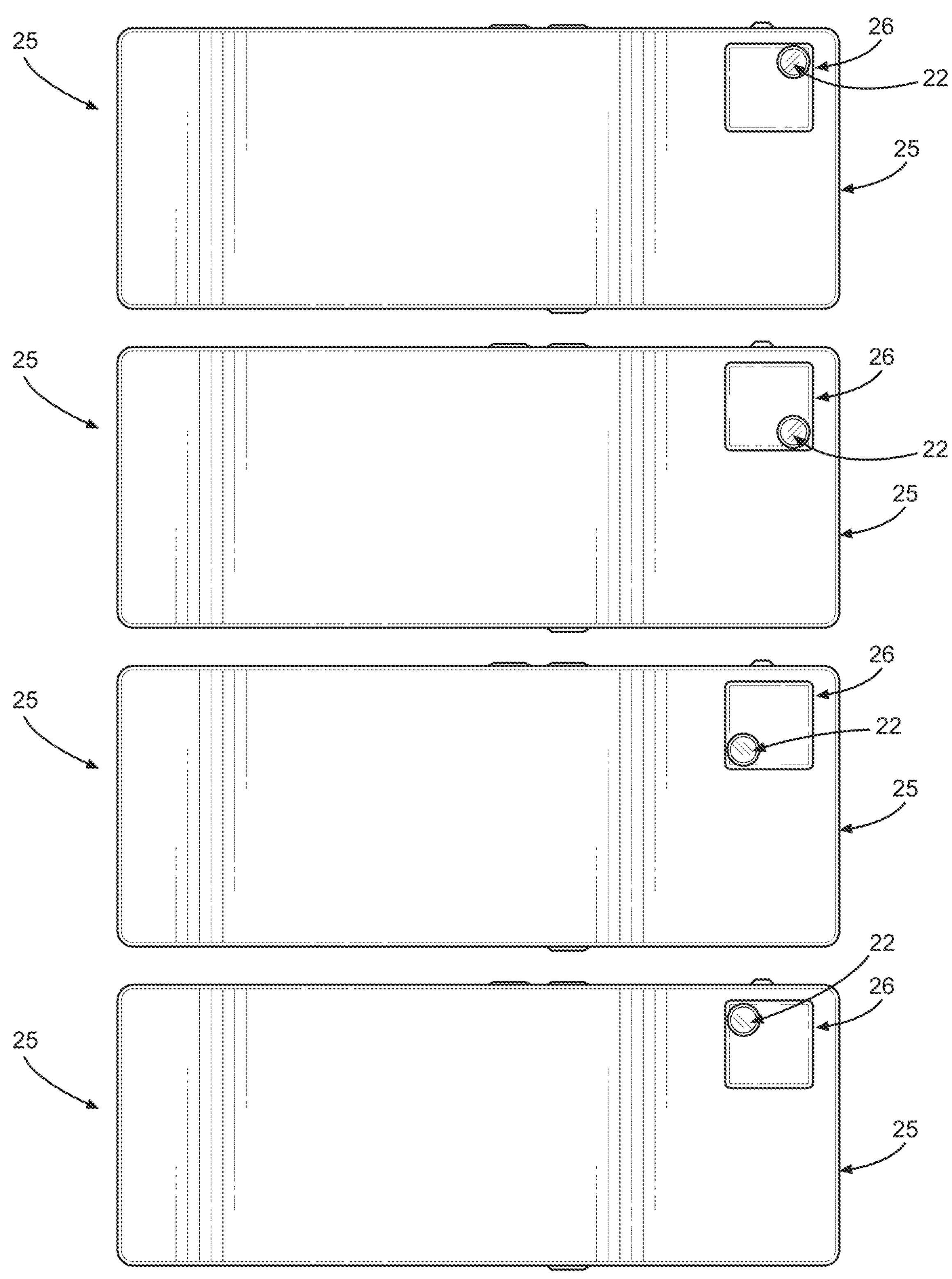
FIG. 13 is a detailed perspective of the focus module housing base 26) being rotated as described in FIG. 12 and located over a desired camera lens 2) and then having the cell phone case module housing adapter 12) mate with female receiver cavity semi-permanent mating adapter system 26) secured into place into the semi-permanent module base attachment mounting system 30) as described in FIG. 12.
Figure 14:
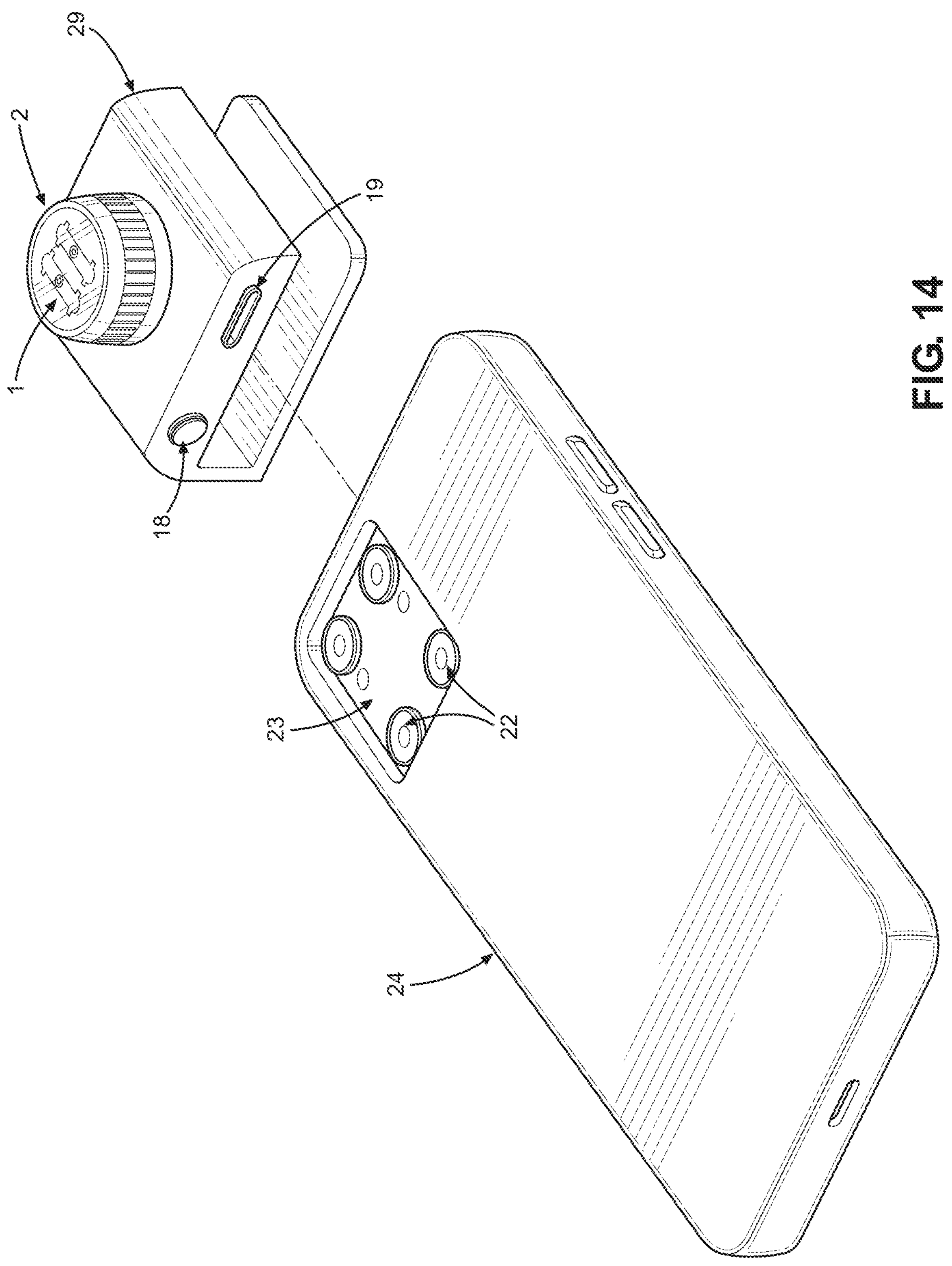
FIG. 14 is a detailed (angle view) perspective of the slide on focus module housing base 29) with focus module housing 2) with fiber Jack and or jack cavities 1) with an on and off switch 18) and battery charging port 19) that slide onto or over the cell phone case 25) and or cell phone 24) without a case and directly secured over the cell phone camera lens 22) and cell phone flash LED.
Figure 16:
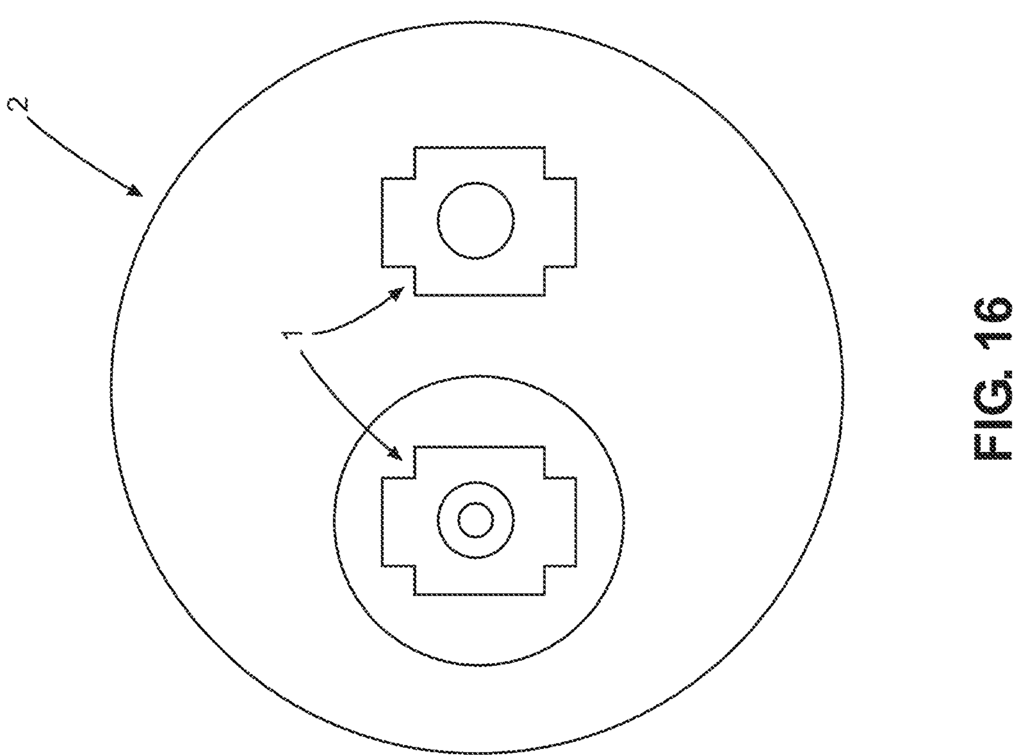
FIG. 16 Is a detailed overhead view of the focus module housing 2) and the Fiber jack cavities 1) showing the mirrored fiber connector plug locking system that is generally found on one side of the fiber connector plug body, The dual jack cavity with the fiber connector locking system now being uniformly on the two opposite sides of the jack cavity allowing the rotation of the Duplex fiber connector plugs and locking into place into the jack cavities providing an avenue for both individual fiber plug in connectors to be inspected while not having to be physically separated to complete the process as it is today.
Figure 15:
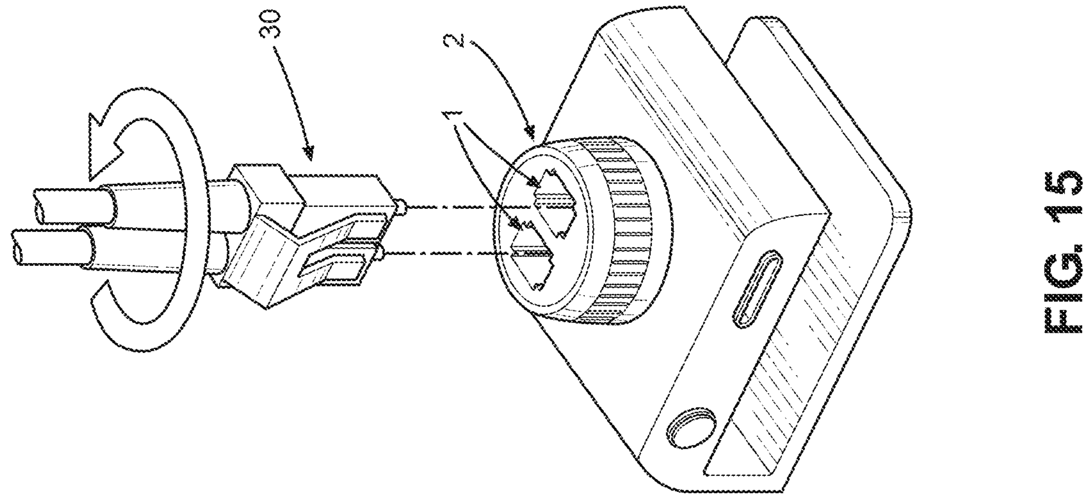
FIG. 15 is a detailed (side view) perspective of the focus module housing 2) and the fiber jack cavity and or cavities 1) with the ability to inspect and or test a single fiber connector fiber end face (Simplex) in one jack cavity that is aligned over the camera lens and or both fiber connector end faces (Duplex) in the dual cavity application by rotating the duplex fiber connect 30) 180 degrees to then reinsert the duplex fiber end faces into the jack cavity positioned in alignment with the active and qualified camera lens for inspection and test.
Figure 17:
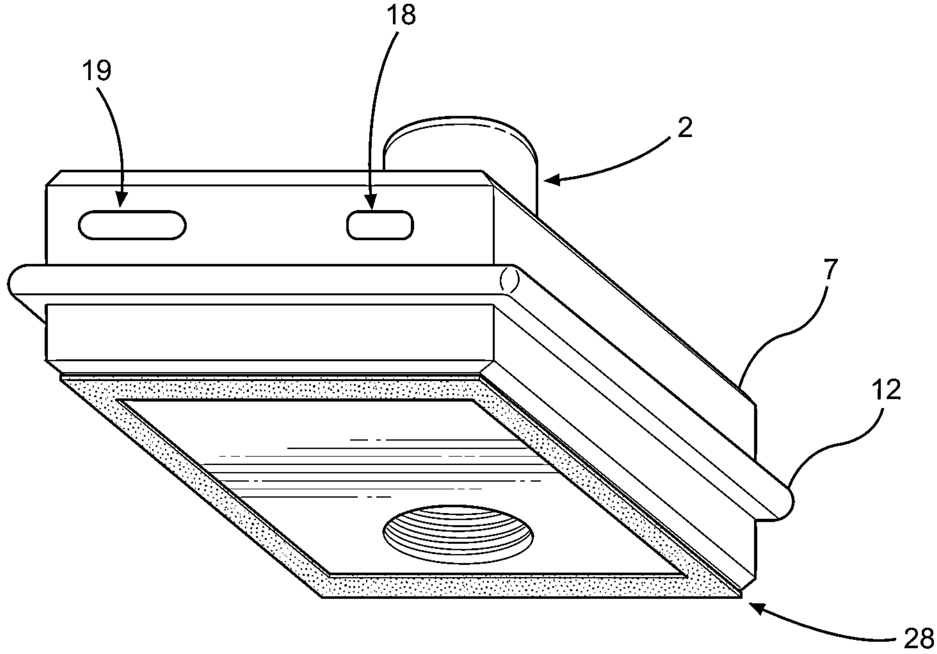
FIG. 17 is a detailed (bottom view) of the focus module housing adapter base 7) with the semi-permanent/removable mounting system 28) that can be applied to all of the different variations of the module housing adapter base allowing/creating more functional applications. For instance FIG. 17 also shows the module housing adapter with male cell phone case cavity mating semi-permanent adapter system 12) and also with the semi-permanent/removable mounting system making the Module housing base adapter more universal. The module housing adapter shows the optional electronics package with the on/off switch 18) and battery charging port 19).
Figures 18, 19, 19A, 19B, 20, 21:
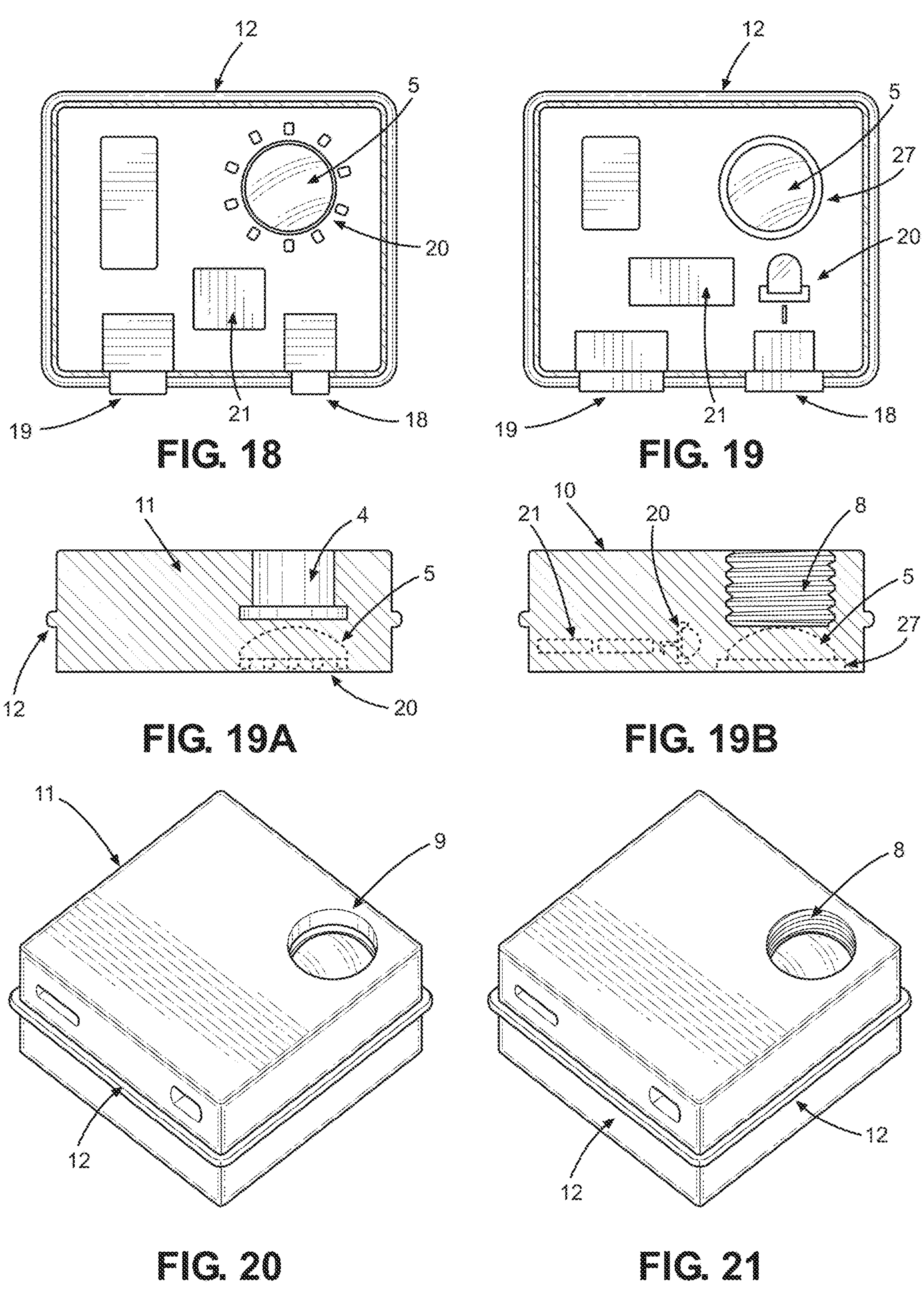
Figure 23:
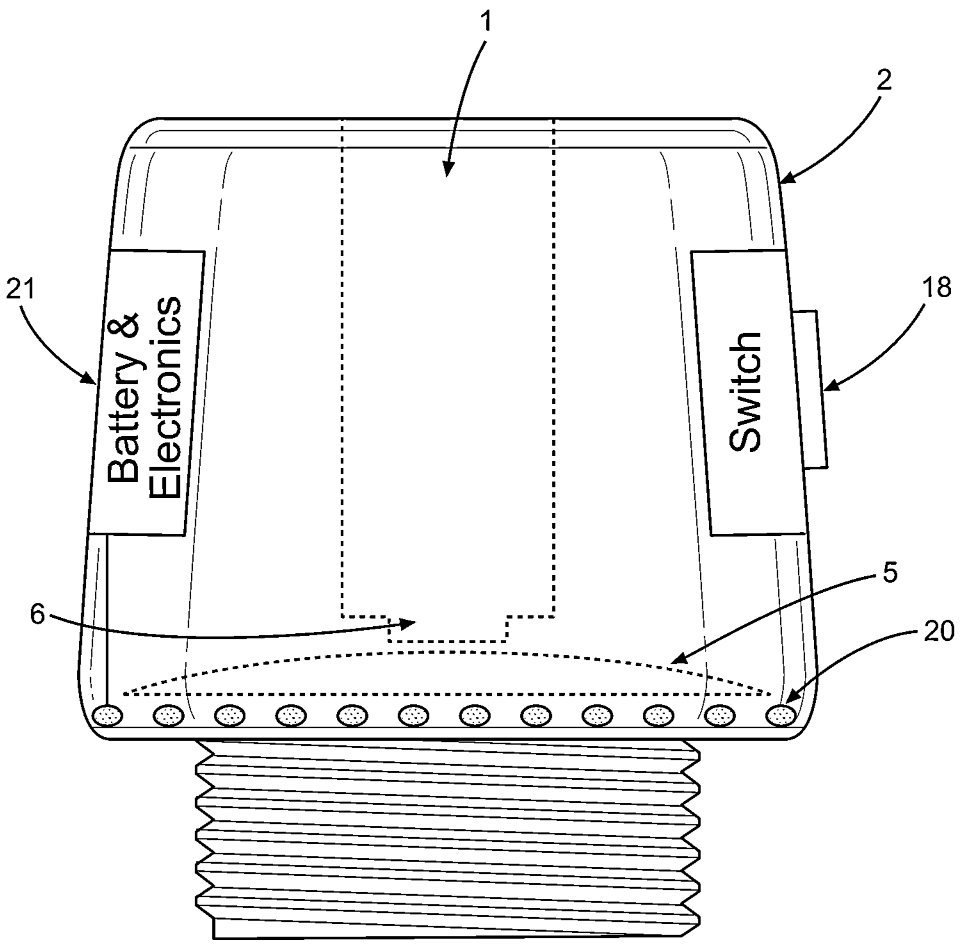
FIG. 23 is a side view cutaway picture of the focus module housing 2), that is fitted with battery and electronic 21) powered lighting LED 20) system with on/off switch 18) to illuminate the fiber jack cavities and or jack cavity 1) and fiber ferrule port guide 6) and Magnification Lens 5)

I claim:

1. A two-piece module housing configured for sliding onto or placing said module over a cell phone camera and/or cameras to allow for inspecting of fiber optic cable and or fiber optic connector cable glass or plastic end face and or end faces by means while holding a Fiber Optic connector and/or ferrule and/or fiber end face and/or end faces in place with a support component and/or equivalent to house a fiber jack cavity or jack cavities with the addition of a second mechanism that (1) rotates and/or (2) slides said module into a position of focusing fiber connector end faces that are temporarily housed in the fiber jack module cavity and/or jack cavities into a position of focusing and/or the field of view of said fiber end faces, said module housing further comprising:

a vertical slide system to a focus adjustment contact point to hold said slide in position once the fiber end face focusing has been achieved for continual inspection at that time;

a horizontal mechanism that can be rotated with a rotation with the addition of contact points around the outer exterior of a rotation mechanism to hold said rotation mechanism in position once the fiber end face focusing has been achieved for said continual inspection at that time;

a lens and/or lenses to increase magnification and/or the field of view of said fiber end faces;

a module housing base that mates to the said module housing which fits onto or over the cell phone camera and/or camera that incorporates a lens and/or lenses to increase magnification and/or the field of view of said fiber end faces when adjusted;

wherein said module housing includes an internal light ring that is operated by a cell phone flash and/or flashlight to illuminate said fiber optic end faces to receive a clear field of view in the inspection area;

wherein said module housing contains a light ring powered by electronics and a battery to illuminate said fiber optic end faces to receive a clear field of view in the inspection area; and wherein the module base housing is configured to have a focus adjustment mechanism positioned over the cell phone camera lens with the focus adjustment mechanism being moved up and down with a slide system and/or rotated with a threaded system into a position to achieve a best field of view in focus position with the greatest magnification capabilities and focusing capabilities, and wherein a mounting plate allows the mounting base housing to be positioned over the lens and/or lenses of said cell phone camera and/or camera to secure the module base housing with a mechanism to focus said module housing.

2. The module base housing of claim 1, wherein said module base housing is designed to be mated to a Cell Phone Case and/or a partial Cell Phone Case.

3. The module base housing of claim 1, wherein said module base housing contains the internal light ring, electronics, battery, and power switch to achieve the field of view fiber inspections of the fiber end faces.

4. The module base housing of claim 1, wherein said module base housing mates and facilitates with and secures a horizontal threaded and/or vertical slide receiving focusing mechanism.

5. The module base housing of claim 1, wherein said module base housing mates and facilitates with and secures the receiving focusing mechanism over the cell phone lens can be a semi-permanent and/or permanent connection with a partial or a full cell phone cover.

6. A module base housing that mates and facilitates with and secures a receiving focusing mechanism while being semi-permanently and/or permanently connected to a partial or full cell phone cover and/or a laptop case and/or a desk top case, said module base housing comprising: an opening that allows a camera lens and/or lenses and a flash to be exposed, said opening on the cell phone and/or said laptop case designed with a mounting lip and/or a mounting system to mate with the module base housing to snap into or onto said opening, wherein said mounting system positions fiber end faces over said camera lens and/or lenses for magnification alignment said module base housing including a mounting plate having a focus adjusting system enabling said module base housing to be positioned corresponding to a various phone types.

7. The module base housing of claim 6, wherein said mounting plate allows the module base housing to be positioned over a desired lens and/or lenses and secure the module base housing with a mechanism that allows focusing of said module base housing.

* * * * *